(12) United States Patent
Coden

(10) Patent No.: US 6,570,880 B1
(45) Date of Patent: *May 27, 2003

(54) CONTROL DATA OVER A RING NETWORK

(75) Inventor: Michael H. Coden, Riverdale, NY (US)

(73) Assignee: ADC Telecommunications, Inc., Minnetonka, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/137,722

(22) Filed: Aug. 21, 1998

(51) Int. Cl.[7] .................. H04L 12/56; H04L 12/433

(52) U.S. Cl. .................. 370/404; 370/255; 370/258; 370/400; 370/401; 370/403; 709/242; 709/251

(58) Field of Search .................. 370/258, 351, 370/389, 400, 909, 912, 254, 255, 401, 403, 404; 379/113, 114, 133, 243, 258, 308, 350; 709/251, 208, 223, 224, 242

(56) References Cited

U.S. PATENT DOCUMENTS

| | | | |
|---|---|---|---|
| 4,293,948 A | 10/1981 | Soderblom | |
| 4,553,234 A | 11/1985 | Brandsma et al. | |
| 4,706,080 A | 11/1987 | Sincoskie | 340/825.02 |
| 4,750,171 A | 6/1988 | Kedar et al. | |
| 4,752,924 A | 6/1988 | Darnell et al. | |
| 4,757,497 A | 7/1988 | Beierle et al. | |
| 4,836,317 A | 6/1989 | Straussmann et al. | 172/2 R |
| 4,908,824 A | 3/1990 | Leibe et al. | |
| 4,933,937 A | 6/1990 | Konishi | |
| 4,947,390 A | 8/1990 | Sheehy | |
| 5,003,531 A | 3/1991 | Farinholt et al. | |
| 5,086,426 A | 2/1992 | Tsukakoshi et al. | |
| 5,101,405 A | 3/1992 | Bekki et al. | |
| 5,105,188 A | 4/1992 | Jung et al. | 340/825.05 |
| 5,107,490 A * | 4/1992 | Wilson et al. | 370/85.3 |
| 5,179,548 A | 1/1993 | Sandesara | |
| 5,218,603 A | 6/1993 | Watanabe | |
| 5,220,562 A | 6/1993 | Takada et al. | |
| 5,243,644 A | 9/1993 | Garland et al. | |
| 5,247,381 A * | 9/1993 | Olmstead et al. | 359/118 |
| 5,295,012 A * | 3/1994 | Wilson et al. | 359/135 |
| 5,301,185 A | 4/1994 | Cherry | |
| 5,327,431 A * | 7/1994 | Heske, III et al. | 370/85.5 |
| 5,337,309 A | 8/1994 | Faulk | |
| 5,412,652 A * | 5/1995 | Lu | 370/85.12 |
| 5,444,692 A | 8/1995 | Basso et al. | |
| 5,471,472 A * | 11/1995 | McClure et al. | 370/85.13 |
| 5,477,540 A | 12/1995 | Yang et al. | |
| 5,483,536 A | 1/1996 | Gunji et al. | |
| 5,490,252 A | 2/1996 | Macera et al. | 395/200.1 |
| 5,495,232 A | 2/1996 | Kochem et al. | 340/825.05 |

(List continued on next page.)

OTHER PUBLICATIONS

M. Zitterbart, A. Tantawy, and D. Serpanos, A High Performance Transparent Bridge, IEEE/ACM Transactions on Networking, vol. 2, No. 4, Aug. 1994. pp. 352–362.*

*Primary Examiner*—Hassan Kizou
*Assistant Examiner*—Joe Logsdon
(74) *Attorney, Agent, or Firm*—Fogg and Associates, LLC

(57) ABSTRACT

A telecommunications network is provided. The network uses a ring of ring switches to provide a transport mechanism for data packets that is transparent to the data and protocols contained in the data packets. This transport mechanism is simple and low cost to implement. Such networks can carry, for example, control data between a primary site and secondary sites of a cable network to set up and deliver pay per view, video on demand or near video on demand programming. The network can also be used, in other embodiments, to provide remote access to utility meters, to centralize network management of the cable network, and other appropriate monitoring and control functions.

40 Claims, 14 Drawing Sheets

U.S. PATENT DOCUMENTS

| | | | |
|---|---|---|---|
| 5,497,370 A | | 3/1996 | Hamada et al. |
| 5,581,710 A | | 12/1996 | Noel et al. .............. 395/200.21 |
| 5,610,905 A | | 3/1997 | Murthy et al. .............. 370/401 |
| 5,617,421 A | | 4/1997 | Chin et al. .................. 370/402 |
| 5,651,000 A | | 7/1997 | Lee et al. .................... 370/258 |
| 5,651,003 A | | 7/1997 | Pearce ........................ 370/395 |
| 5,657,314 A | * | 8/1997 | McClure et al. ............ 370/401 |
| 5,657,327 A | | 8/1997 | Hamada et al. ............. 370/389 |
| 5,659,543 A | | 8/1997 | Ater et al. ................... 370/258 |
| 5,684,800 A | | 11/1997 | Dobbins et al. ............ 370/401 |
| 5,781,549 A | * | 7/1998 | Dai ............................. 370/398 |
| 5,802,278 A | * | 9/1998 | Isfeld et al. ............ 395/200.02 |
| 5,815,490 A | * | 9/1998 | Lu .............................. 370/223 |
| 5,845,069 A | | 12/1998 | Winiger |
| 5,857,075 A | * | 1/1999 | Chung ................... 395/200.53 |
| 5,872,783 A | | 2/1999 | Chin .......................... 370/392 |
| 5,892,922 A | | 4/1999 | Lorenz .................. 395/200.68 |
| 5,909,549 A | * | 6/1999 | Compliment et al. .. 395/200.53 |
| 5,909,686 A | | 6/1999 | Muller et al. ................ 707/104 |
| 5,920,566 A | | 7/1999 | Hendel et al. .............. 370/401 |
| 5,946,313 A | * | 8/1999 | Allan et al. ................. 370/397 |
| 5,961,597 A | * | 10/1999 | Sapir et al. ................. 709/224 |
| 5,978,373 A | * | 11/1999 | Hoff et al. ................... 370/395 |
| 6,011,780 A | * | 1/2000 | Vaman et al. ............... 370/237 |
| 6,012,099 A | * | 1/2000 | Chung ........................ 709/249 |
| 6,049,528 A | * | 4/2000 | Hendel et al. .............. 370/235 |
| 6,049,824 A | * | 4/2000 | Simonin ..................... 709/219 |
| 6,112,232 A | * | 8/2000 | Shahar et al. ............... 709/217 |
| 6,115,385 A | * | 9/2000 | Vig ............................. 370/401 |
| 6,122,667 A | * | 9/2000 | Chung ........................ 709/228 |
| 6,154,462 A | * | 11/2000 | Coden ........................ 370/403 |
| 6,208,647 B1 | * | 3/2001 | Deng et al. ................. 370/390 |
| 6,262,988 B1 | * | 7/2001 | Vig ............................. 370/401 |

* cited by examiner

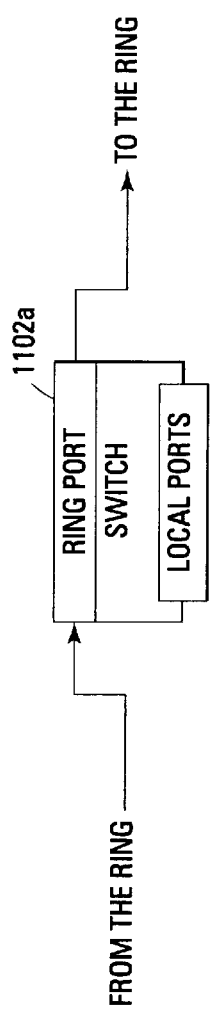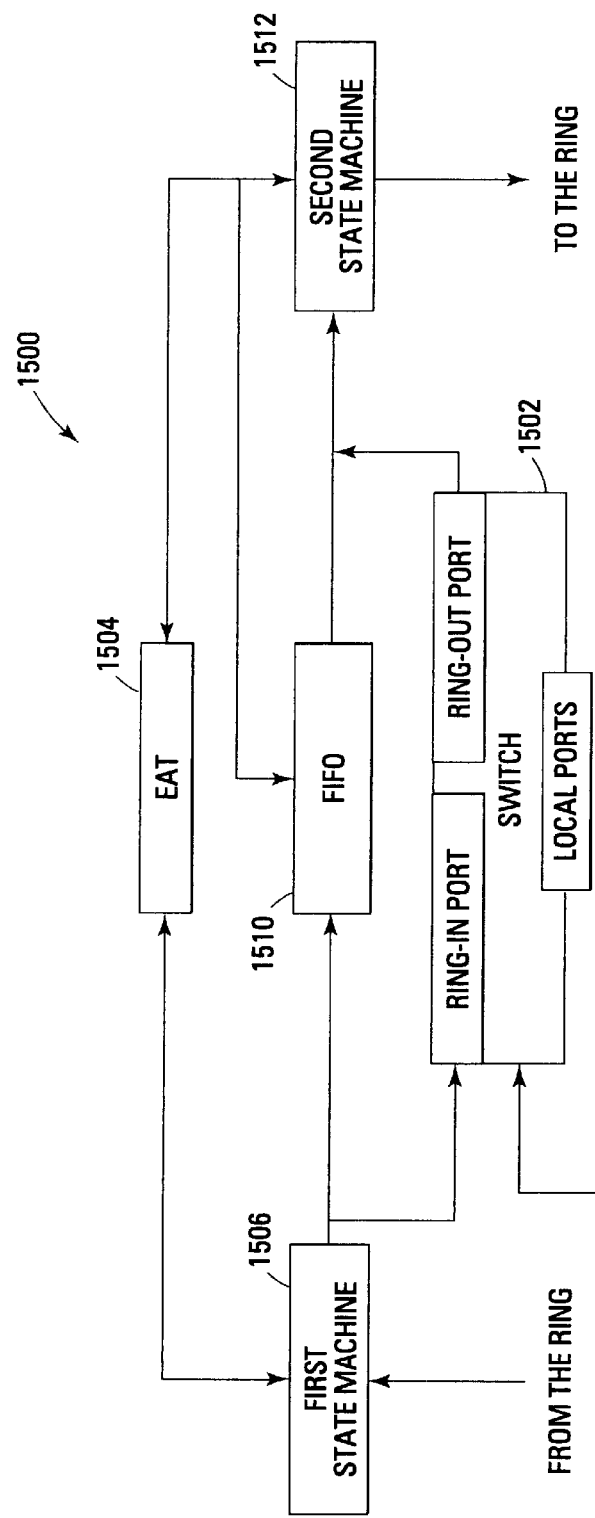

CONTROL DATA OVER A RING NETWORK

This application is related to U.S. Pat. No. 6,154,462, entitled Circuits and Methods for a Ring Network, issued on Nov. 28, 2000 and to U.S. Pat. No. 6,049,824, entitled System and Method for Modifying an Information Signal In a Telecommunications System, issued on Apr. 11, 2000, which U.S. Patents are incorporated herein by reference.

This application is also related to co-pending applications:

Ser. No. 09/138,232, entitled Transport of Digitized Signals Over a Ring Network, filed on Aug. 21, 1998, pending.

Ser. No. 09/137,721, entitled Internet Access Over a Ring Network, filed on Aug. 21, 1998, pending.

Each of these Applications is incorporated by reference.

This application is also related to application Ser. No. 09/137,669, entitled Telecommunication Network with Variable Address Learning, Switching and Routing, filed on Aug. 21, 1998, pending.

TECHNICAL FIELD OF THE INVENTION

The present invention relates generally to the field of telecommunications and, in particular, to transport of control data over a ring network such as the transport of signals between a set top box and a master controller at a head end of a cable system. Further applications include, for example, monitoring and controlling power consumption of subscribers of a power company and network management of a cable television or other distributed system.

BACKGROUND

Telecommunications companies, such as cable television operators, provide "programming" or "content" to subscribers over a wide variety of networks. Initially, cable operators provided subscribers with improved access to a number of commercial and premium programming stations over a network of coaxial cables. Further, new commercial programming stations have entered the marketplace over the cable networks. These stations include the USA Network, Nickelodeon, CNN, and others.

To further increase revenues, some cable operators further provide access to selected movies and other programming on a pay-per-view basis. Conventionally, the cable operators schedule a number of showings of specified movies on selected channels and at specified times. Typically, these systems operate by scrambling the video portion of the pay per view channel. When a subscriber requests the program, the cable operator activates the descrambler at the subscriber's premises to descramble the selected show at the scheduled time.

With the increase in competition for the entertainment resources of consumers, cable operators and other content providers have tried to create more flexible systems for delivering video programming to subscribers. For example, the cable industry has begun to design networks that provide "video on demand." Essentially, with this type of system, a user can select from a list of movies for viewing at any time. One problem with delivering video on demand, and even more traditional pay per view, is transmitting the request for the programming from the subscriber to the head end controller of the cable network.

In conventional systems, a set top box can be used to transmit a request for a pay per view event to the head end of the cable system. A subscriber enters information, such as a program code, into the set top box via either a key pad on the box or a remote control. This information is typically transmitted over the coaxial cable to a hub of the cable network as a low speed, e.g., 13800 baud, digital signal. At the hub, the signal is received by Set Top Box Controller (STBC). The STBC converts the signal to Ethernet packets which are transmitted around the network to a master controller. If the network interconnection is a SONET, leased line, or other standard telecommunications network interconnection, the Ethernet packets typically must be encapsulated or transformed into another format for transmission over that backbone to the head end controller to complete the set up of the pay per view event for the subscriber. Set top boxes, and controllers with Ethernet interfaces are commercially available from companies such as the ANIC set top box controller product from General Instruments Corporation.

In a further effort to increase revenues and profits from their investment, operators are considering, or planning to add new services that can be carried over their systems. Among the many services that cable operators are considering, or planning to offer are meter reading for utilities, energy consumption control for utilities, and other services, all of which can be carried over the same network infrastructure that carries the control data from a set top box and a set top box controller.

Additionally, in an effort to cut costs, cable operators are installing more and more remote control and management devices for controlling and managing elements of their own network. These devices often have Ethernet interfaces for the information that must be transferred from the primary site with the master controller or control console, to the control devices distributed throughout the network. The data that must be transferred among these devices can also be transferred over the same infrastructure that would carry set top box and utility control information.

Conventionally, Synchronized Optical Networks (SONET) rings provide a high capacity backbone to interconnect the various hubs of a cable network. SONET rings were developed around the ability to transport voice channels with fixed size packets in a high speed ring network for telephony service. SONET rings are expensive to use to carry information from an STBC or other controller to a head end controller due in part to the fact that the Ethernet packets usually are converted to a different format, e.g., asynchronous transfer mode (ATM).

As an alternative to using the SONET rings to transport the data to the head end, some cable companies lease telephone lines for connecting the various STBCs and other controllers to the head end controller. This is an expensive solution to get the data to the head end.

For the reasons stated above, and for other reasons stated below which will become apparent to those skilled in the art upon reading and understanding the present specification, there is a need in the art for a transport mechanism to carry control data in a telecommunications network.

SUMMARY OF THE INVENTION

The above-mentioned problems with telecommunications systems and other problems are addressed by the present invention and will be understood by reading and studying the following specification. A telecommunications network is described which uses a ring of ring switches to provide a backbone transport mechanism for data packets that is transparent to the data and protocols contained in the data packets. The ring switches can include a number of different features, alone or in combination, to implement this backbone network. Ring switches with such features are described in detail in U.S. Pat. No. 6,154,462, entitled Circuits and Methods for a Ring Network, issued on Nov. 28, 2000, and in Section III below. The ring switches include, but are not limited to, the following:

1. A ring switch in which packets are switched on to a unidirectional ring based on comparing a destination identifier, which may already be in the packet, to a table in the ring switch.
2. A ring switch in which packets are switched off and removed from the unidirectional ring based on comparing a destination identifier, which may already be in the packet, to a table in the ring switch thus freeing bandwidth for use by other devices and switches on the ring.
3. A ring switch in which packets received from a unidirectional ring, are placed back on the unidirectional ring based on comparing a destination identifier, which may already be in the packet, to a table in the ring switch.
4. A ring switch in which packets which have traveled completely around the ring are terminated by comparing a source identifier which may be already in the packet to a table, a switch identifier that was added by the ring switch to a table, or a hop counter that has reached a threshold value.
5. A ring switch in which no modification is made to the original packet in order to cause the packet to transmit from the local ports of one ring switch, around the ring to the local ports of another ring switch because the destination identifiers used to compare to the table are already contained in the original packet.
6. A ring switch in which no modification is made to the original packet in order to cause the packet to be terminated when the packet has traveled completely around the ring because the source identifiers used to compare to the table are already contained in the original packet.
7. A ring switch in which the tables are built automatically (self learned) by virtue of reading the source identifiers of each packet received by the ring switch.
8. A ring switch in which the original packet is modified slightly by the ring switch when placing the packet on a unidirectional ring by the addition of a switch identifier such that when the packet has traveled completely around the ring and back to the originating ring switch, the packet is terminated by detecting its own switch identifier.
9. A ring switch in which the original packet is modified slightly by the ring switch when placing the packet on the unidirectional ring by the addition of a counter, such that when the packet passes through each ring switch, the counter is incremented (or decremented) and the packet is terminated by any switch when the counter reaches a selected value.

This transport mechanism is simple and low cost to implement. Such networks can carry, for example, control data between a head end and hubs of a cable network to set up and deliver pay per view, video on demand or near video on demand programming. The network can also be used, in other embodiments, to provide remote access to utility meters, to centralize network management of the cable network, and other appropriate monitoring and control functions.

BRIEF DESCRIPTION OF THE DRAWINGS

FIG. 5 is a block diagram of a ring switch according to the teachings of the present invention.

FIG. 7 is a block diagram of an embodiment of a modified Ethernet switch according to the teachings of the present invention.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

I. First Embodiment

Figure 1:
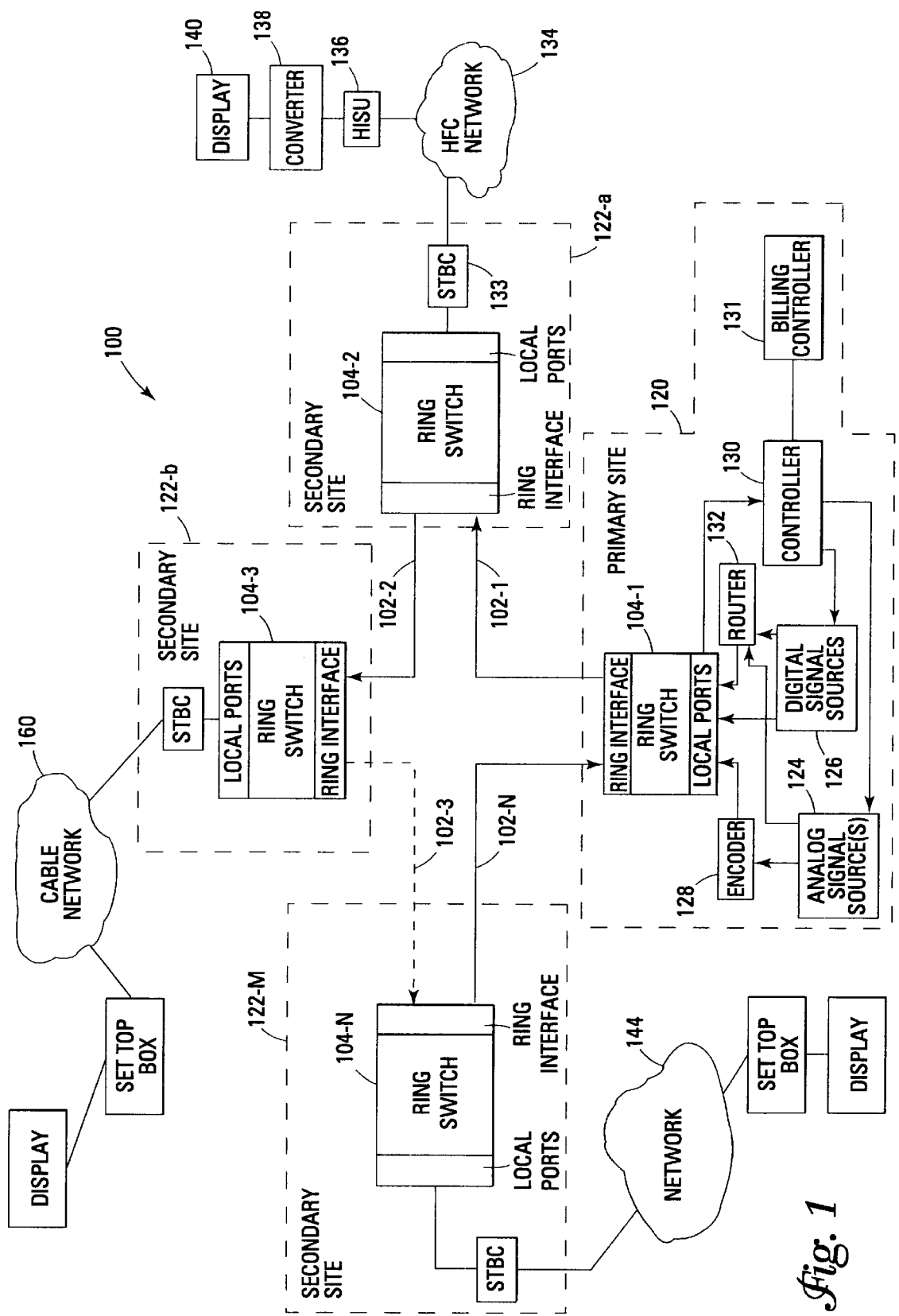
FIG. 1 is a block diagram of an embodiment of a network for delivery of set top box control data, such as data for pay per view, video on demand or near video on demand according to the teachings of the present invention.

FIG. 1 is a block diagram of an embodiment of a network, indicated generally at 100, for delivery of control signals between a primary site and various subscriber units according to the teachings of the present invention. For example, network 100 transports data packets from converter 138, e.g., a set top box, to controller 130 at the primary site 120 over a ring of ring switches 104-1 through 104-N to deliver services such as pay per view, video on demand and near video on demand. Ring switches 104-1 through 104-N are constructed according to U.S. Pat. No. 6,154,462, entitled Circuits and Methods for a Ring Network, issued on Nov. 28, 2000, and Section III below. These ring switches provide a transport mechanism that is transparent to the data and protocols contained in the data packets. For purposes of this specification, the term "ring switch" includes, but is not limited to:

1. A ring switch in which packets are switched on to a unidirectional ring based on comparing a destination identifier, which may already be in the packet, to a table in the ring switch.
2. A ring switch in which packets are switched off and removed from the unidirectional ring based on comparing a destination identifier, which may already be in the packet, to a table in the ring switch thus freeing bandwidth for use by other devices and switches on the ring.
3. A ring switch in which packets received from a unidirectional ring, are placed back on the unidirectional ring based on comparing a destination identifier, which may already be in the packet, to a table in the ring switch.
4. A ring switch in which packets which have traveled completely around the ring are terminated by comparing a source identifier which may be already in the packet to a table, a switch identifier that was added by the ring switch to a table, or a hop counter that has reached a threshold value.
5. A ring switch in which no modification is made to the original packet in order to cause the packet to transmit from the local ports of one ring switch, around the ring to the local ports of another ring switch because the destination identifiers used to compare to the table are already contained in the original packet.
6. A ring switch in which no modification is made to the original packet in order to cause the packet to be terminated when the packet has traveled completely around the ring because the source identifiers used to compare to the table are already contained in the original packet.
7. A ring switch in which the tables are built automatically (self learned) by virtue of reading the source identifiers of each packet received by the ring switch.
8. A ring switch in which the original packet is modified slightly by the ring switch when placing the packet on a unidirectional ring by the addition of a switch identifier such that when the packet has traveled completely around the ring and back to the originating ring switch, the packet is terminated by detecting its own switch identifier.
9. A ring switch in which the original packet is modified slightly by the ring switch when placing the packet on the unidirectional ring by the addition of a counter, such that when the packet passes through each ring switch, the counter is incremented (or decremented) and the packet is terminated by any switch when the counter reaches a selected value.

Further, this transport mechanism is simple and low cost to implement to carry, for example, control signals between primary site 120 and secondary sites 122-*a*, 122-*b*, . . . , 122-*m*.

The term "Ethernet" includes the entire class of Carrier Sense Multiple Access/Collision Detection (CSMA/CD) protocols covered by the family of computer industry standards known variously as IEEE-802.3 and ISO 8802/3. This includes but is not limited to 1-megabit Ethernet, known as "StarLAN", 10-megabit Ethernet, 100 Megabit Ethernet, known as "Fast Ethernet", 1-gigabit Ethernet, known as "Gigabit Ethernet" and any future CSMA/CD protocols at any other data rates.

Advantageously, network 100 provides a transport mechanism for a number of services. For example, network 100 can provide control information for set top boxes, utility meters, pay per view, "video on demand" or "near video on demand" services or other services to subscribers. "Video on demand" refers to a service that provides programming, e.g., movies, from a primary site to a subscriber at a requested time. The primary site operates essentially as a remote video player for the subscriber providing such features as pause, rewind, fast forward, and other conventional video player functions. "Near video on demand" is a more limited service that allows a subscriber to request a programming that is offered at a specific time. Typically, near video on demand does not provide conventional video player features.

The backbone network will typically consist of a primary site and at least one secondary site. The term "primary site" includes the head end of a Cable Television network, the Central Office of a telephone system, and other types of main control sites in telecommunications networks. All three of these terms: primary site, head end and central office may be used interchangeably. The term "secondary site" includes the hubs or remote head ends of a Cable Television network, the Satellite Offices of a telephone system, and other types of remote sites in a telecommunications network. All three of these terms: secondary site, hub and satellite office may be used interchangeably.

A. The Primary Site

Primary site 120 provides digital signals to network 100 for transport to subscribers. In one embodiment, the digital signals are provided by digital signal sources 126 such as a digital video server, e.g., movies stored on the disks of the server using video compression as prescribed by the Motion Pictures Expert Group (MPEG) or other appropriate compression techniques. In another embodiment, the digital signals are provided from analog video sources 124, e.g., conventional video equipment, through digital encoder 128. Digital encoder 128 may comprise, for example, an encoder that encodes analog video signals according to a standard, e.g., MPEG. Alternatively, other encoders can be used that convert the analog signals to other digital formats with or without compression. It is noted that primary site 120 may include a mix of digital and analog signal sources.

Primary site 120 includes a controller 130. Controller 130 receives requests from subscribers for delivery of digital data, e.g., video programming, from subscribers over network 100 as described more fully below. Controller 130 selects the digital signals to be provided over network 100 to the subscribers. Further, controller 130 provides this information to billing computer 131.

B. The Transport Ring

Ring switches 104-1 through 104-N are coupled in a ring by transmission medium 102-1 through 102-N. Transmission medium 102-1 through 102-N may comprise, for example, a ring of fiber transport systems such as a number of DV6000 fiber transport systems, available from ADC Telecommunications of Minnetonka, Minn., and associated fiber optic cable. The DV6000 provides 16 channels of capacity for transporting data. In one embodiment, only one channel of the DV6000 is used to transmit the data packets. The other channels may be used for additional ring switch networks or other purposes, e.g., video, voice or other data transmission. Alternatively, transmission medium 102-1 through 102-N may be implemented with other conventional transport mechanisms such as, for example, wireless transceivers, fiber optic cables and transceivers, coaxial cables and transceivers, or other appropriate medium for transmitting data packets between the ring switches in network 100.

Ring switches 104-1 through 104-N each include one or more local ports. The local ports are coupled to local networks, e.g., hybrid fiber/coax (HFC) network 134, cable network 160, and network 144. Alternatively, the local network may be a copper wire or wireless network or a Digital Subscriber Loop (DSL) network. The local networks carry data switched off the ring to network devices of local subscribers. The local ports can include ports that are configured for use with Ethernet, Token Ring, ATM, FDDI or other appropriate network protocol. As used in this specification, the term "network devices" includes, but is not limited to, hubs, computer terminals and workstations, routers, switches, gateways, televisions, high definition televisions set top boxes, utility meters, and other devices that are conventionally or unconventionally coupled to a network.

C. Operation of the Network

In operation, ring switches 104-2, . . . 104-N of secondary sites 122-a, . . . , 122-m switch packets received from primary site 120 to a local port based on identifiers, e.g., Media Access Control (MAC) addresses, Internet Protocol (IP) addresses, or other appropriate identifiers, of the packets that correspond to network devices associated with the local port. Secondary sites 122-a, . . . , 122-m can treat the packets from the primary site in a number of different ways based on the equipment at the destination network device and the nature of the network coupled to the local port. Various alternatives for delivery to the destination network device are described in co-pending application Ser. No. 09/138,232, entitled Transport of Digitized Signals Over a Ring Network, filed on Aug. 21, 1998 and incorporated by reference above.

Transmission of packets from the primary site to a network device is initiated by a request from a network device. For example, a subscriber initiates a request for access to a program by entering, for example, a programming code into converter 138, e.g., a set top box. The converter generates a signal, referred to generally as "control information," that is transmitted over HFC network 134 to set top box controller (STBC) 133. STBC 133 converts the control information to, for example, Ethernet packets and passes the packets to a local port of ring switch 104-2. The packets are transmitted around the ring to ring switch 104-1 at the primary site 120. These signals are switched off the ring to a local port of ring switch 104-1 to controller 130. Controller 130 takes action, e.g., initiating transmission of requested video programming, based on the control information. In the context of video on demand, the control information could also be a request to pause the transmission of the video signal or other conventional video player functions. Controller 130 also provides the control information to billing computer 131 for incorporation into the subscribers billing record. It is understood that control information can also be transmitted in a similar manner from controller 130 at the primary site 120 to subscriber terminals at remote locations.

II. Second Embodiment

Figure 2:
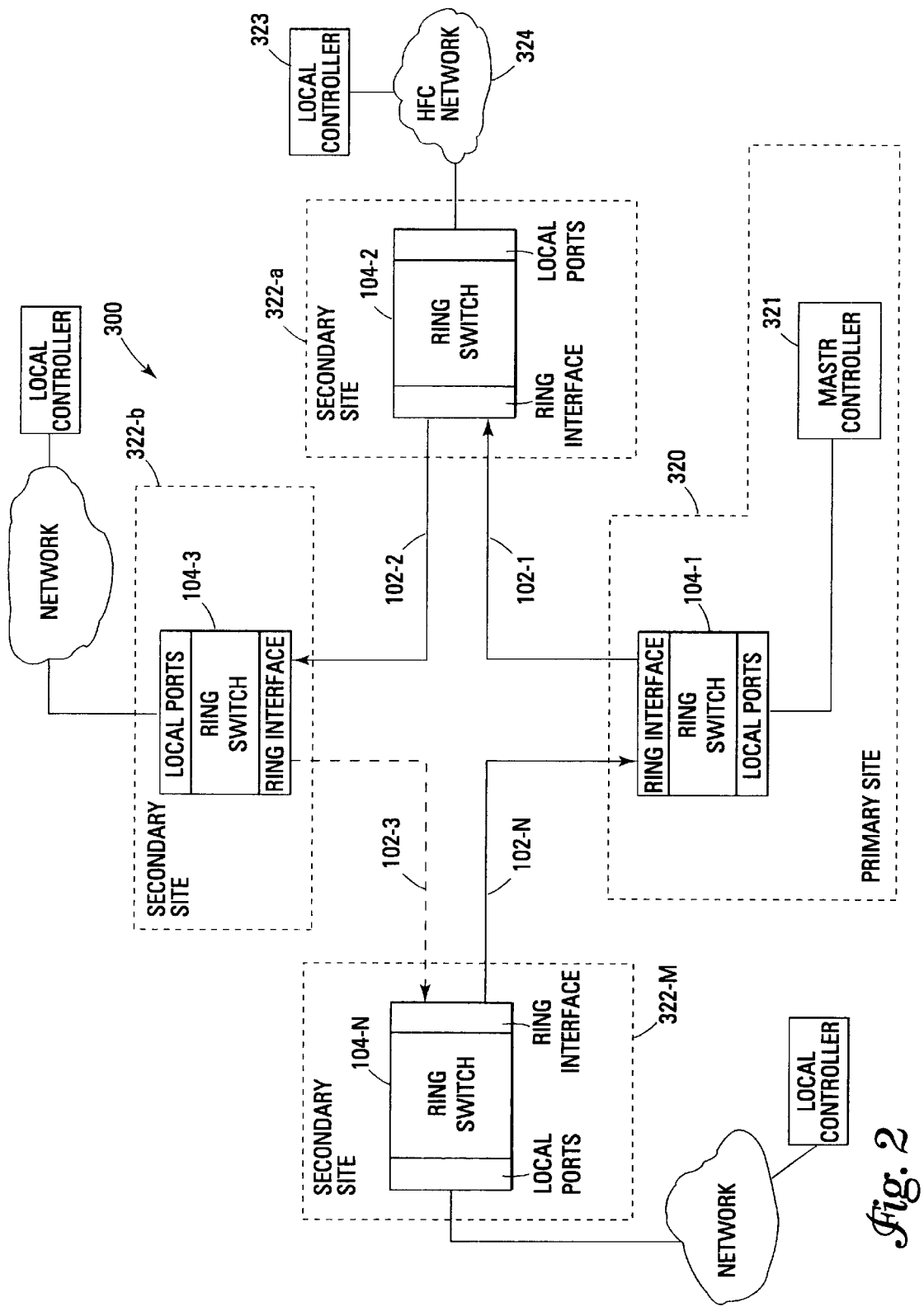
FIG. 2 is a block diagram of an embodiment of a network for transmitting some of the other forms of control data that can be transmitted according to the teachings of the present invention.

FIG. 2 is a block diagram of an embodiment of a network, indicated generally at 300, for delivering control data according to the teachings of the present invention. Network 300 includes a number of ring switches 104-1 through 104-N. Again, the ring switches advantageously are constructed as described above with respect to FIG. 1. These switches provide a transport mechanism that is transparent to the data and protocols contained in the data packets. Further, this transport mechanism is simple and low cost to implement to carry signals between the various locations.

Ring switches 104-1 through 104-N of network 300 are coupled in a ring by transmission medium 102-1 through 102-N as described above with respect to FIG. 1.

Network 300 includes primary site 320 and secondary sites 322-a, . . . , 322-m. The secondary sites 322-a, . . . , 322-m each include one of the ring switches. The local ports of a ring switch may be coupled to a wide variety of networks and/or devices to transfer control data or information between the master controller 321 and local controllers. For example, the local ports of ring switch 104-2 are coupled to hybrid fiber/coax (HFC) network 324. HFC network 324 includes, for example, a Homeworx system commercially available from ADC Telecommunications of Minnetonka, Minn. In this embodiment, a home integrated subscriber unit (HISU) 326 is provided at the subscriber's premises. The HISU is coupled to local controller 323. In one embodiment, local controller 323 is used to monitor utilities at a subscriber's premises, e.g., power or water consumption. Advantageously, this information is transmitted to primary site controller 321 over network 320 for generation of bills for the subscriber without the need for manual reading of a meter. Further, controller 321 and local controller 323 can also be used to regulate the use of equipment at the subscriber's premises to avoid, for example, overloading the power companies ability to provide power service. Network 300 can also be used in other monitoring and controlling applications.

III. Other Embodiments

Figure 3:
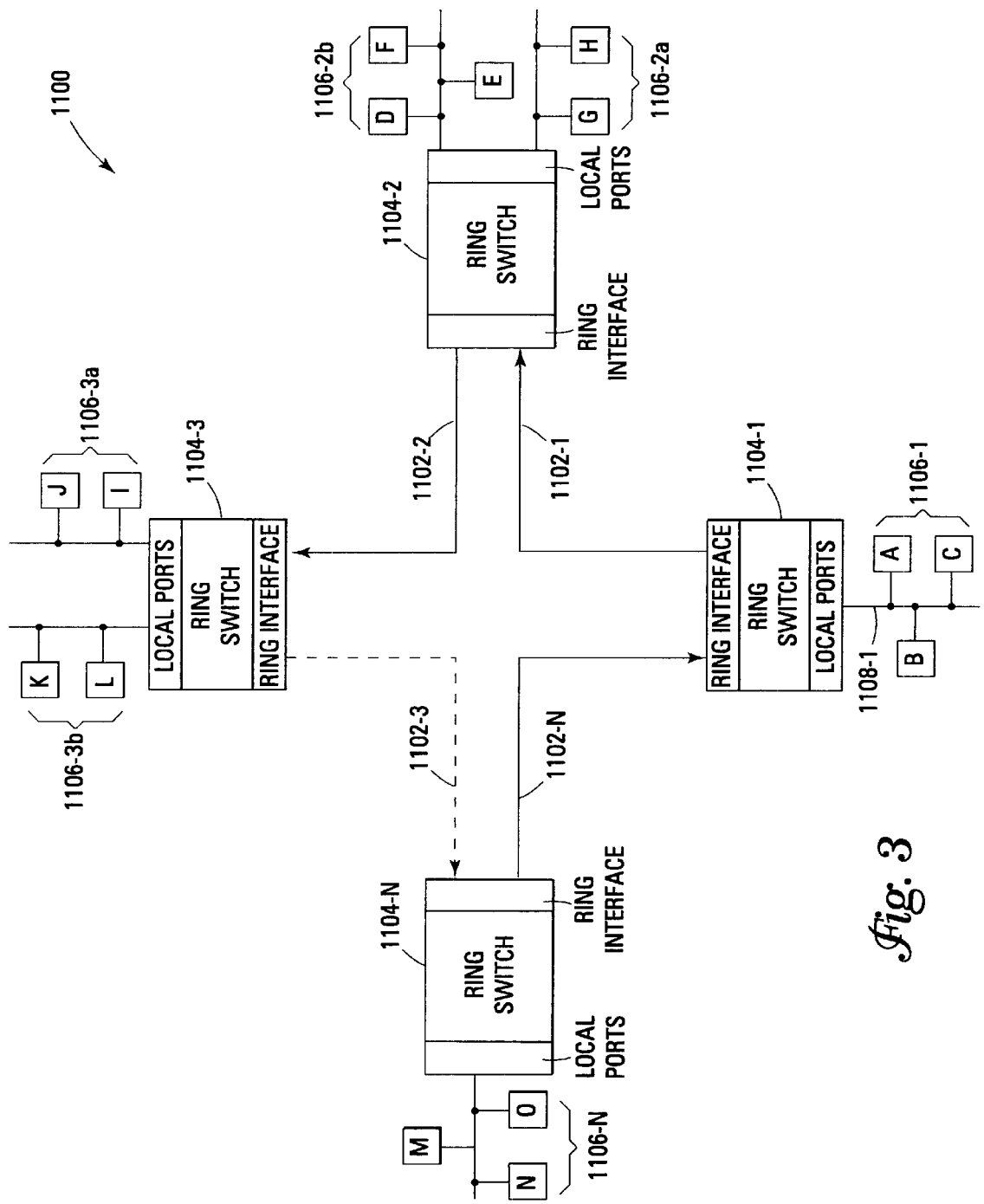
FIG. 3 is a block diagram of an embodiment of a ring network according to the teachings of the present invention.
Figure 4:
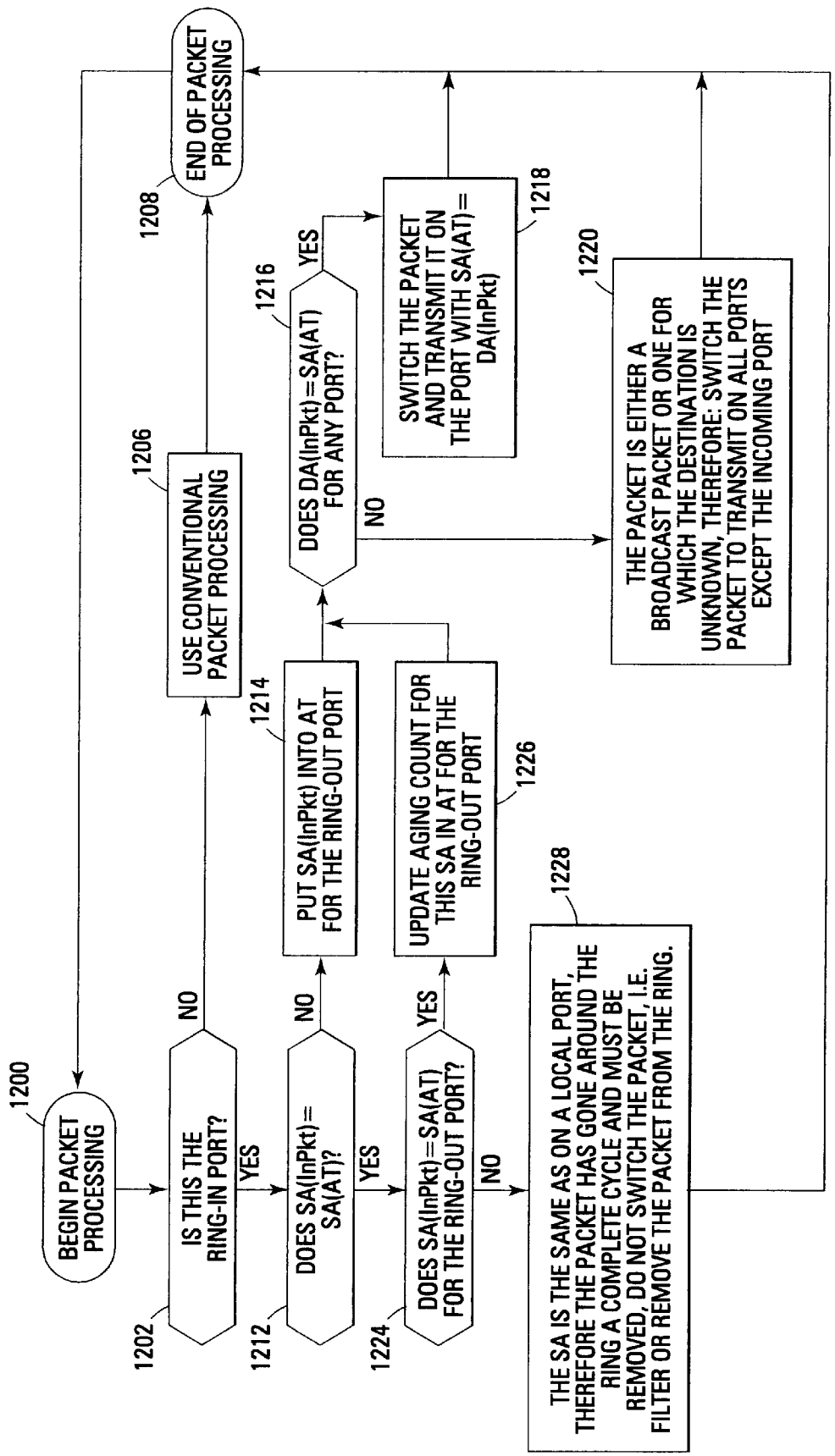
FIG. 4 is a flow chart for an embodiment of a method for processing data packets in a ring network according to the teachings of the present invention.
Figure 6:
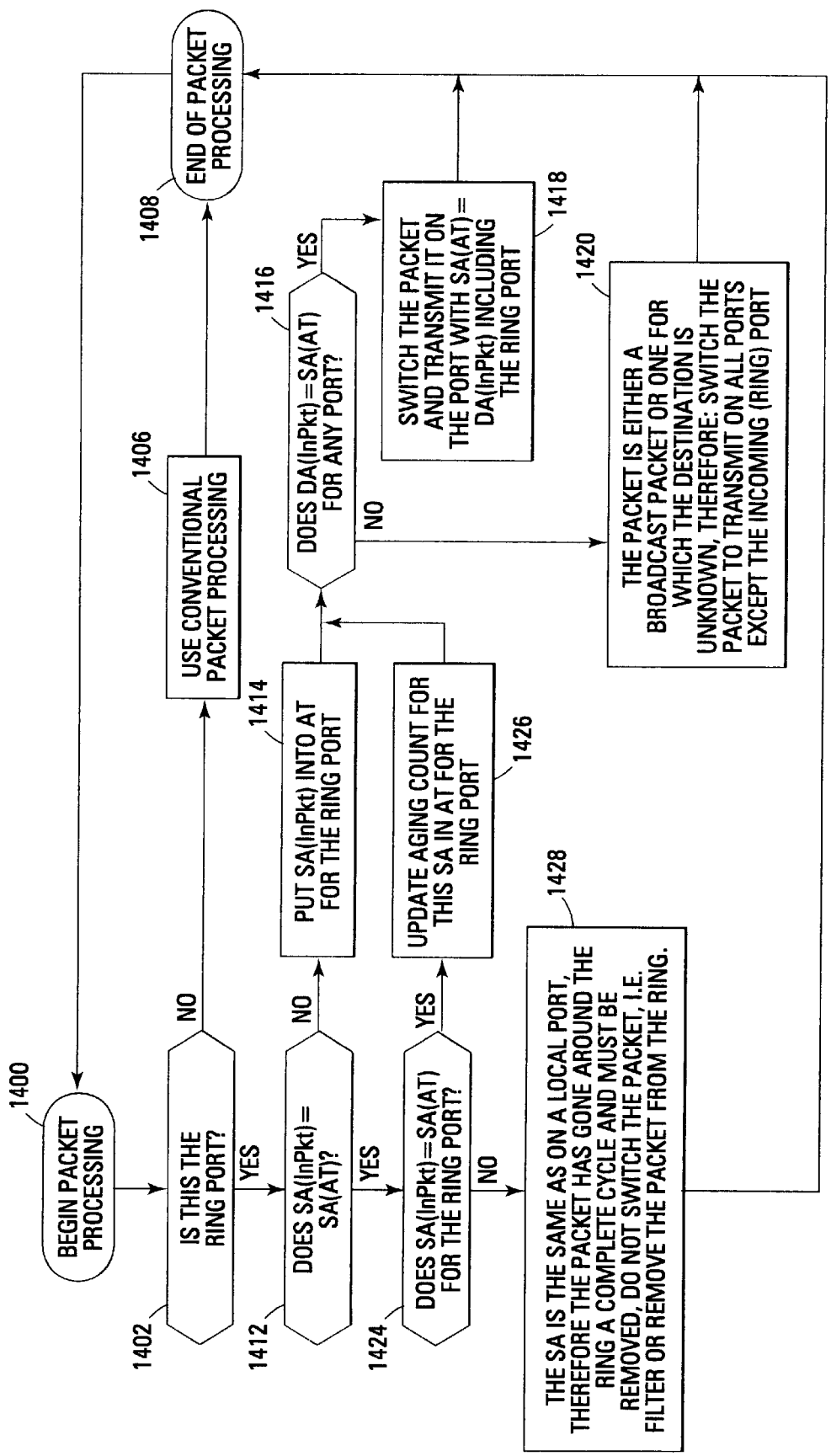
FIG. 6 is a flow chart that illustrates another embodiment of a method for processing data packets in a ring network according to the teachings of the present invention.
Figure 8:
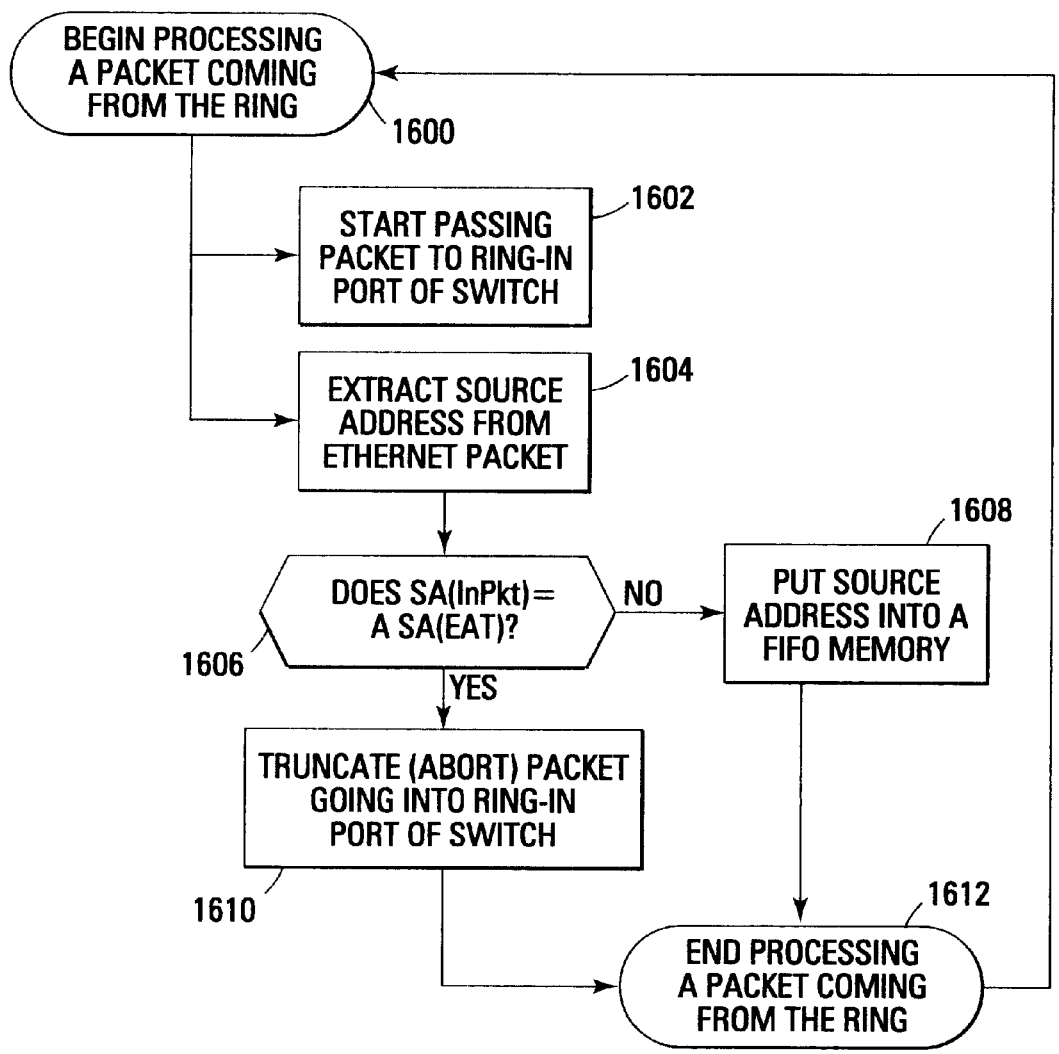
FIG. 8 is a flow chart that illustrates an embodiment of a method for identifying packets with invalid destination addresses according to the teachings of the present invention.
Figure 9:
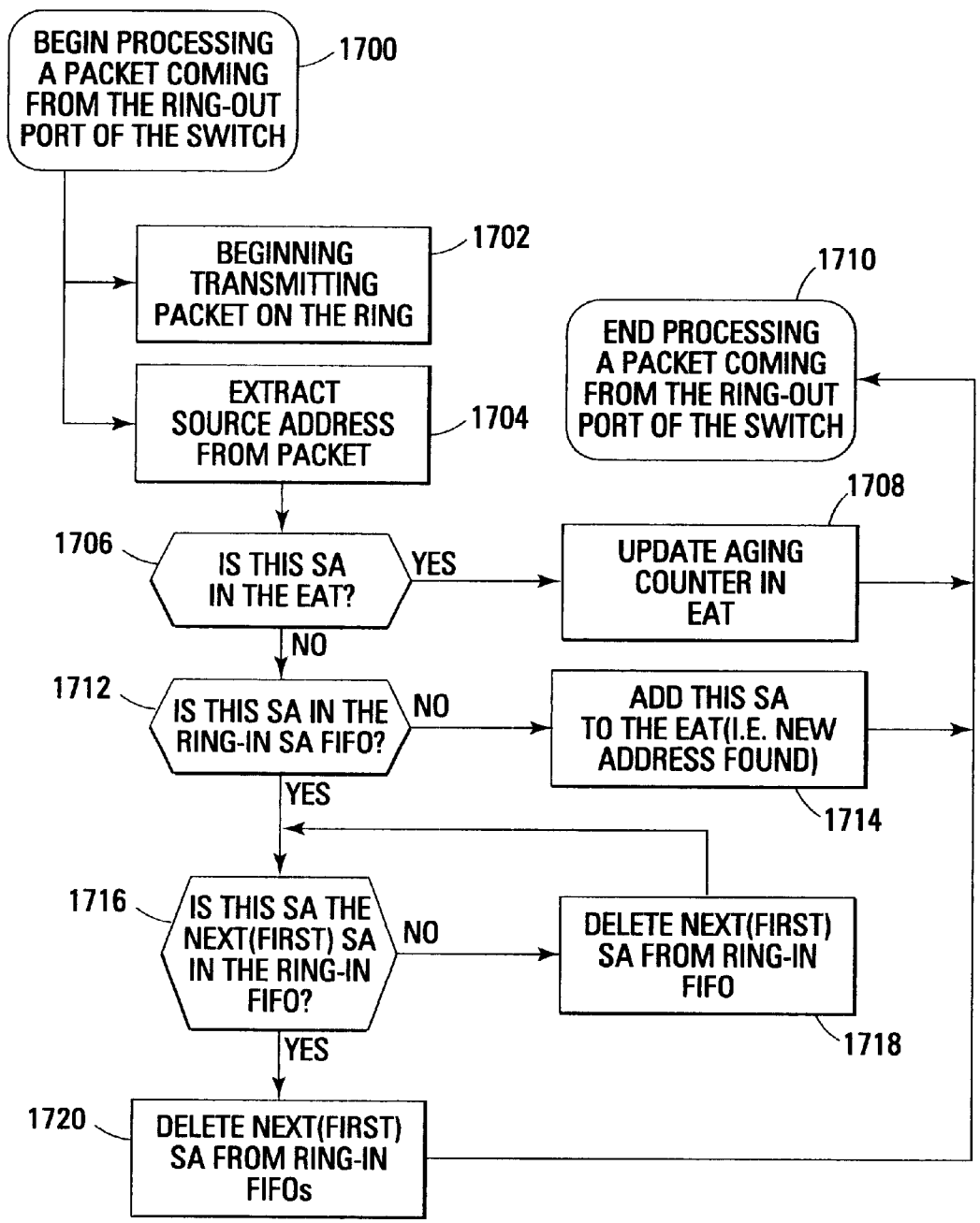
FIG. 9 is a flow chart that illustrates an embodiment of a method for learning the addresses of terminals associated with local ports of an Ethernet switch according to the teachings of the present invention.
Figure 10:
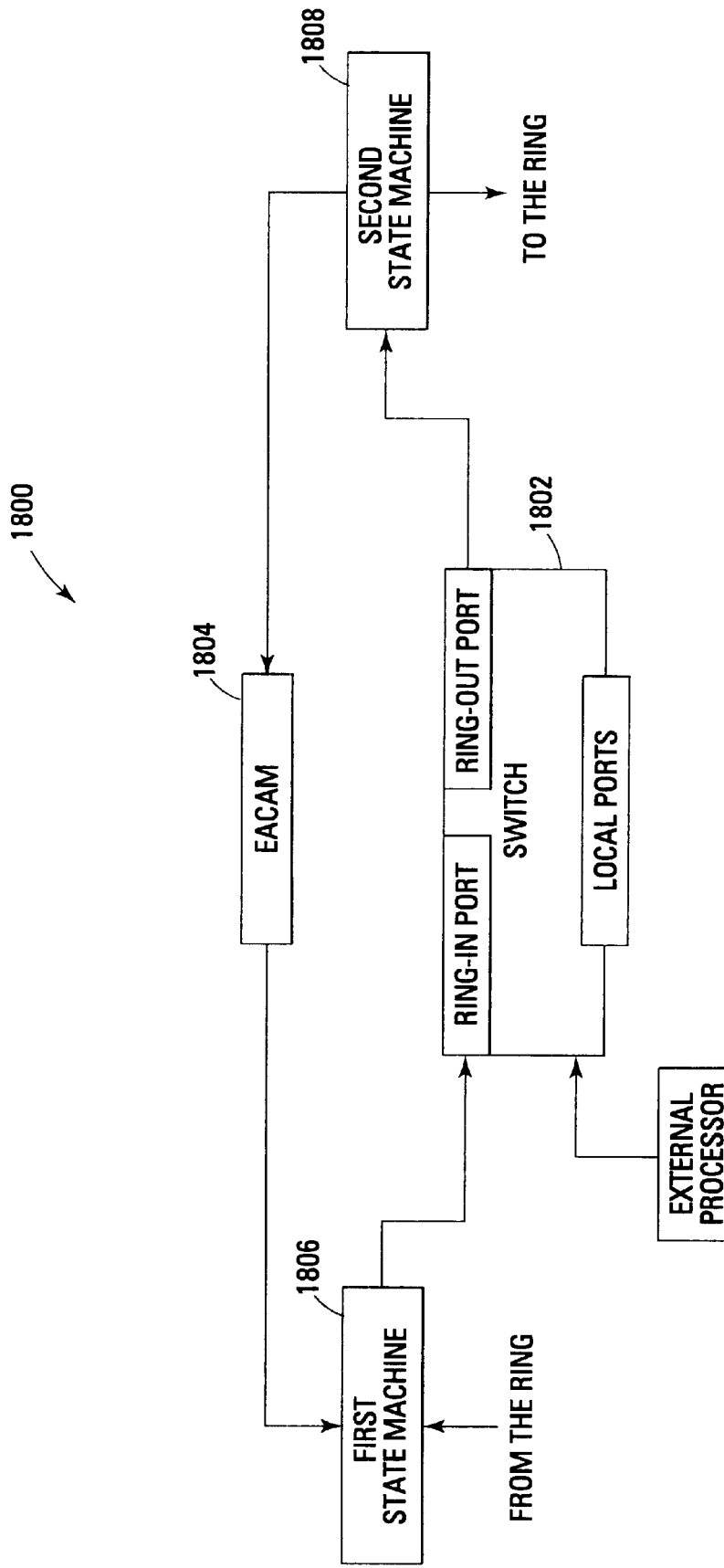
FIG. 10 is a block diagram of another embodiment of a modified Ethernet switch according to the teachings of the present invention.
Figure 11:
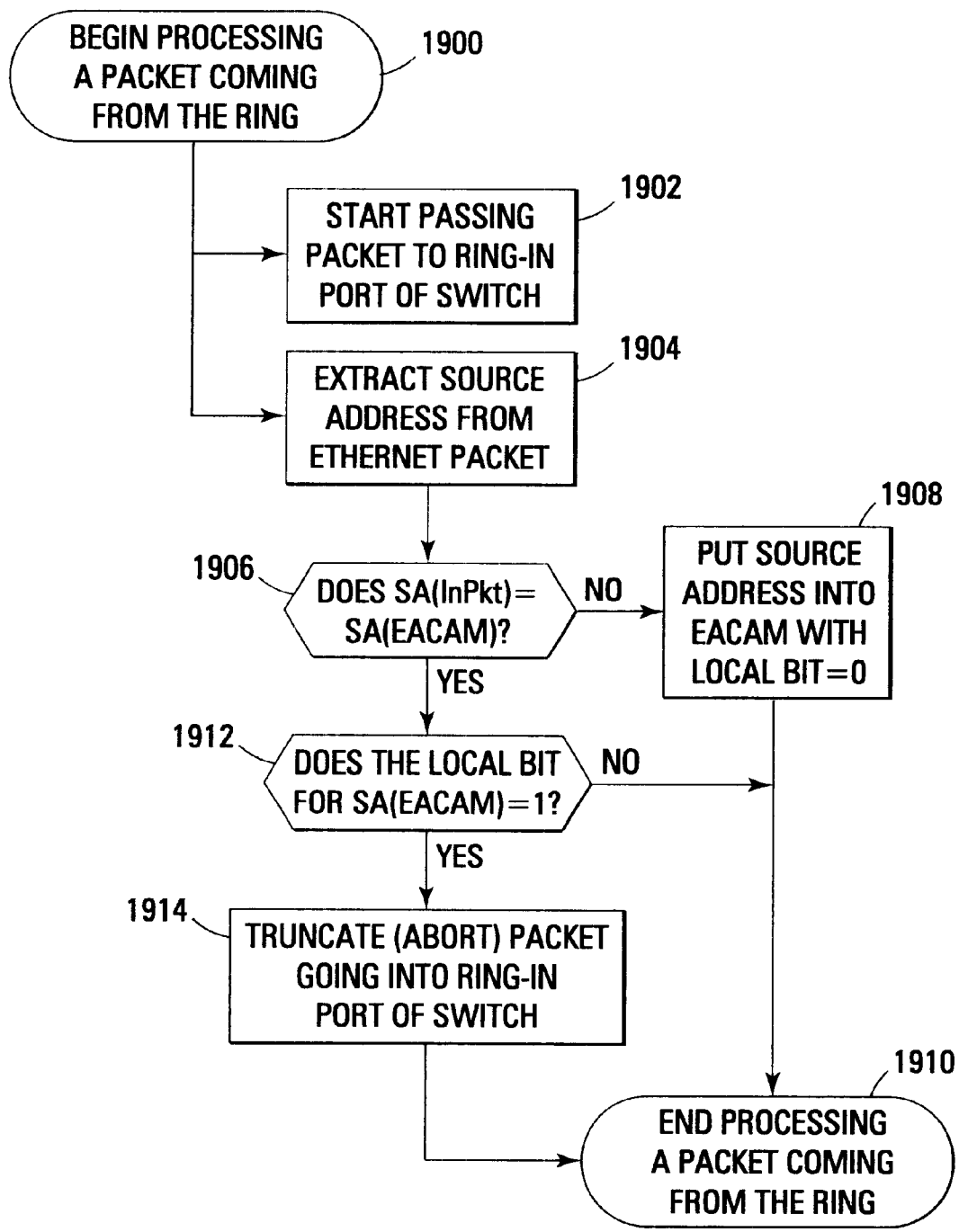
FIG. 11 is a flow chart that illustrates another embodiment of a method for identifying packets with invalid destination addresses according to the teachings of the present invention.
Figure 12:
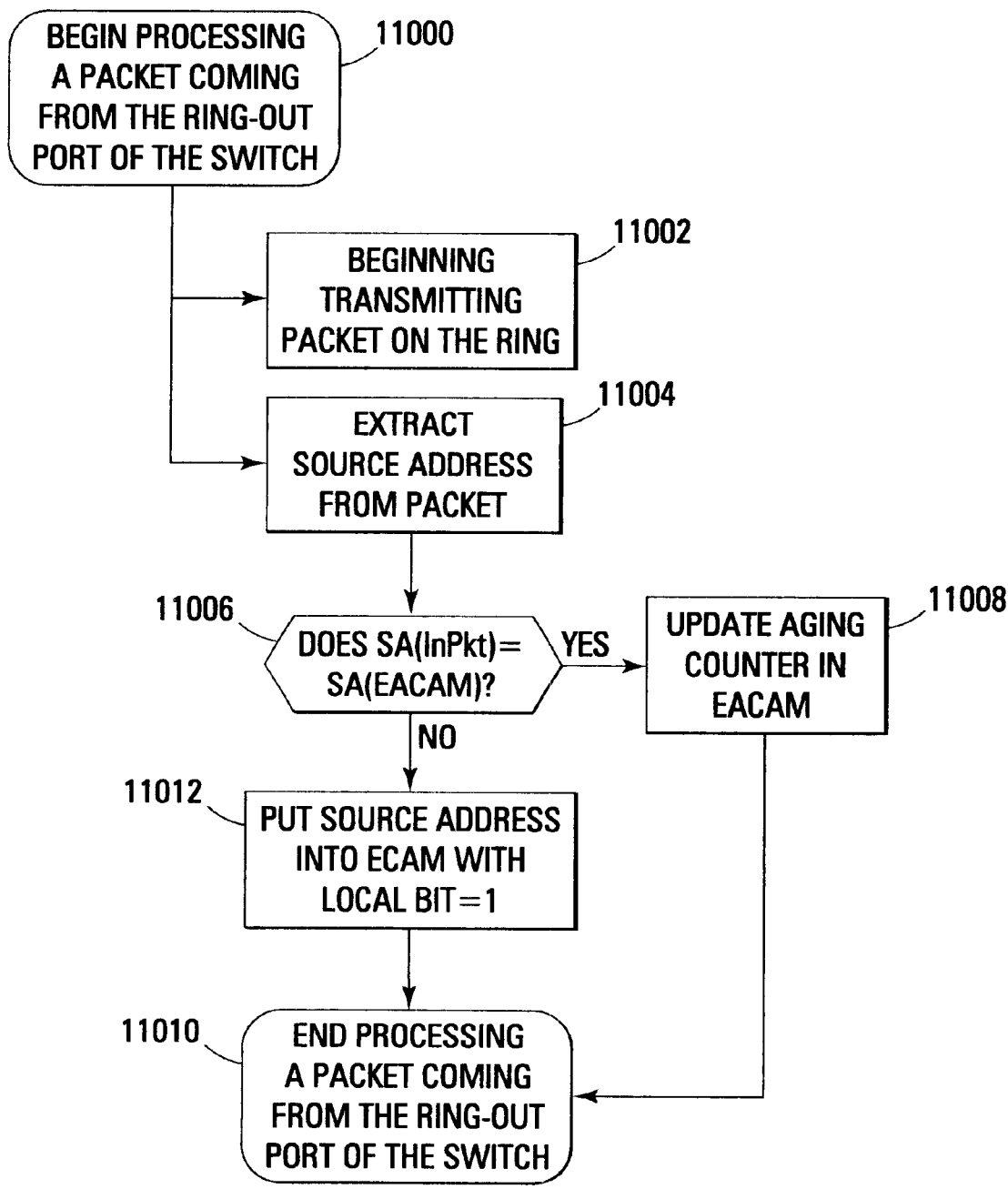
FIG. 12 is a flow chart that illustrates another embodiment of a method for learning the addresses of network devices associated with local ports of an Ethernet switch according to the teachings of the present invention.
Figure 13:
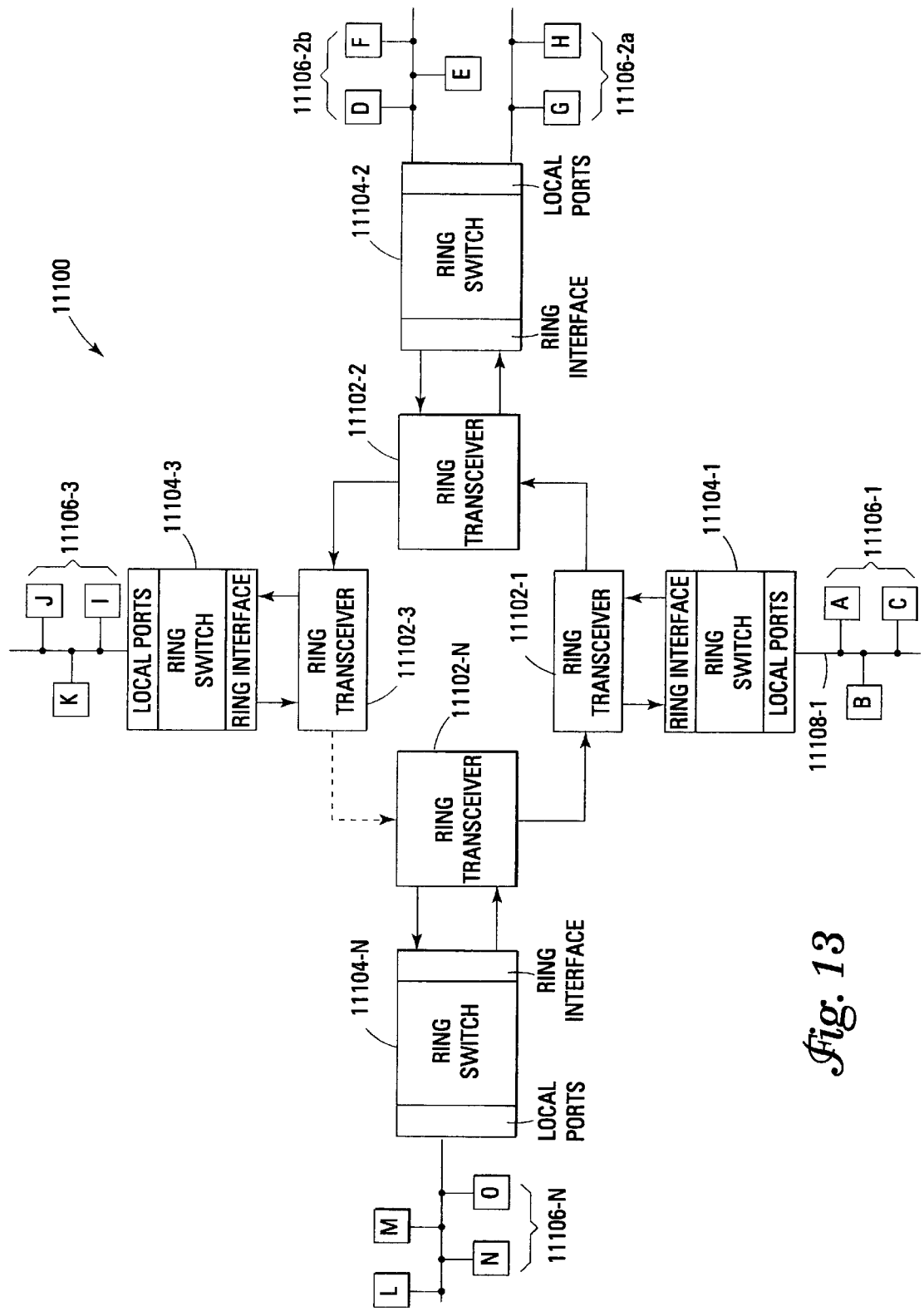
FIG. 13 is a block diagram of another embodiment of a ring network according to the teachings of the present invention.
Figure 14:
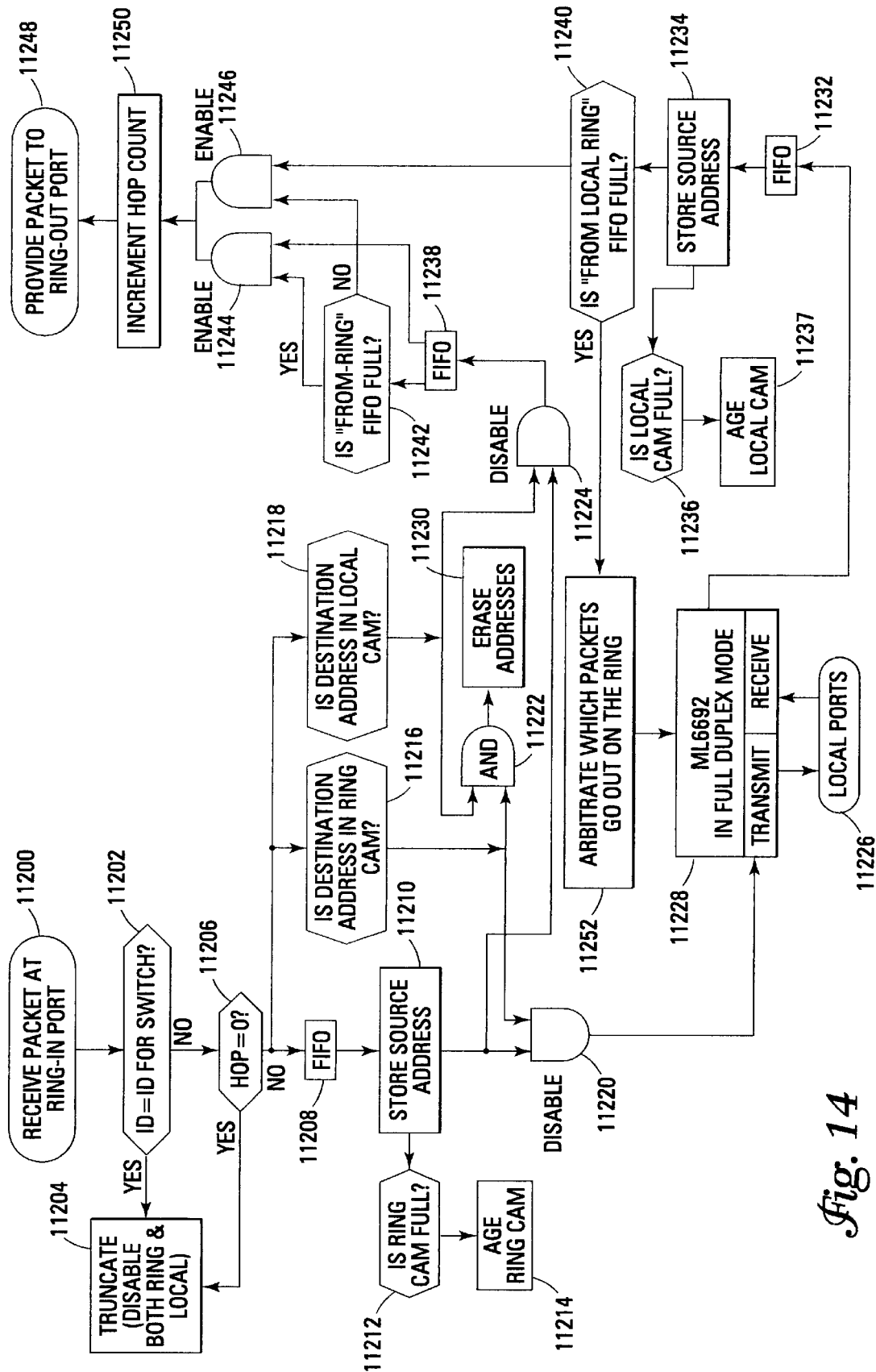
FIG. 14 is a block diagram of a method for processing data packets by a ring switch according to the teachings of the present invention.
Figure 15:
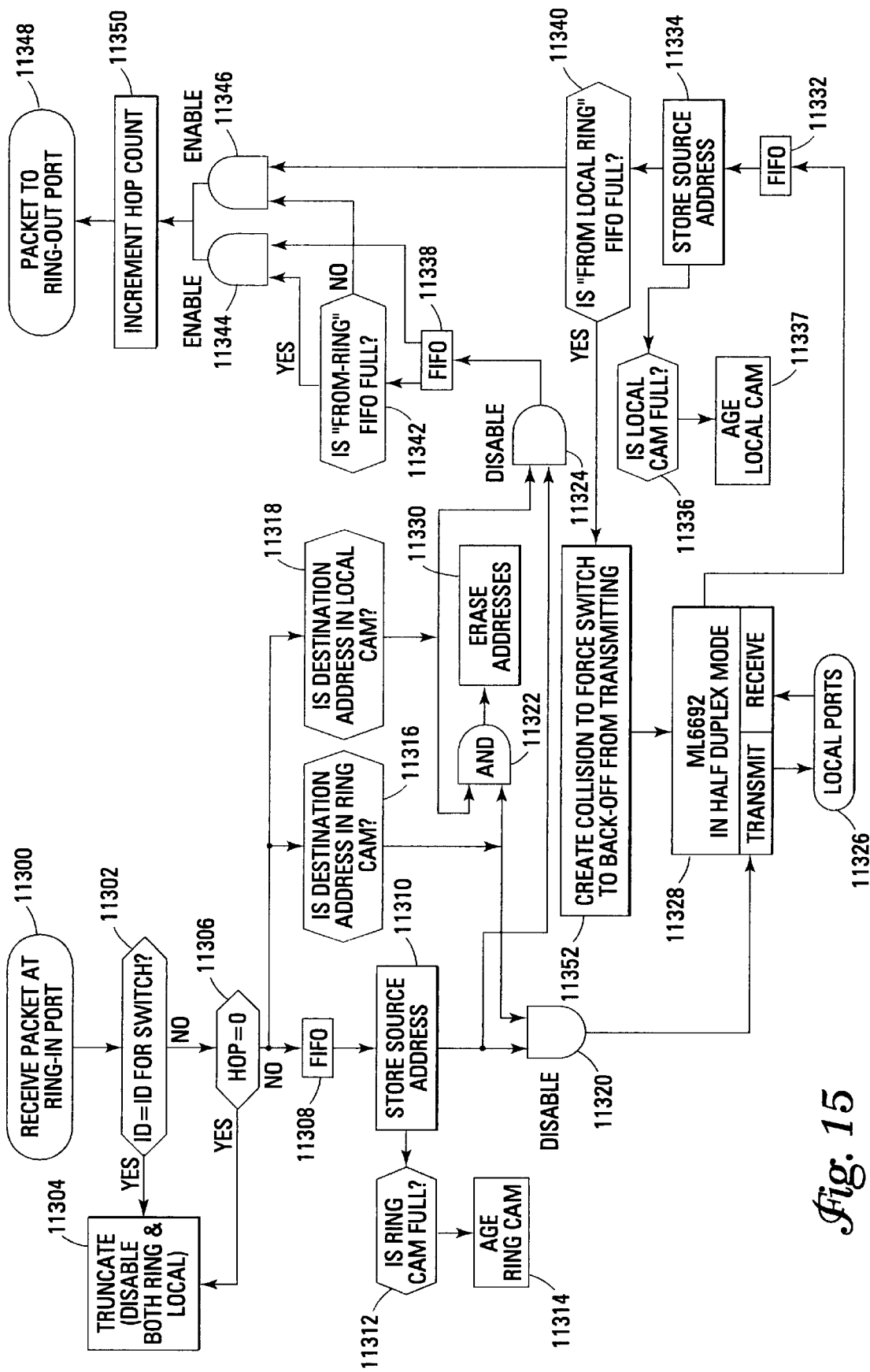
FIG. 15 is a block diagram of another method for processing data packets by a ring switch according to the teachings of the present invention.

FIG. 3 is a block diagram of an embodiment of a system, indicated generally at 1100, for transmitting data packets in a unidirectional ring network.

For purposes of this specification, the term data packets includes Ethernet, Token Ring, FDDI, Asynchronous Transfer Mode ("ATM") and other data packets with a format that includes at least a source identifier (e.g., source address), a destination identifier, payload data, and, optionally, an error correction code such as a cyclical redundancy check. The payload data may comprise, for example, video data (with or without compression), audio data, control data, other data, or any appropriate combination of data-types.

Conclusion

A telecommunications network in various embodiments has been described. In each embodiment, the network uses a ring of ring switches (defined above) to provide a transport mechanism for data packets that is transparent to the data and protocols contained in the data packets. This transport mechanism is simple and low cost to implement. Such networks can carry, for example, control data between a primary site and secondary sites of a cable network to set up and deliver pay per view, video on demand or near video on demand programming. The network can also be used, in other embodiments, to provide remote access to utility meters, to centralize network management and control of the cable network, and other appropriate monitoring and control functions.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, multiple ring switches can be used in each location in the ring to increase the bandwidth of the network. A wide variety of networks and devices can be coupled to the local ports of the ring switches. Further, many different signals can be used for the identifier that the switches use in performing switching functions. For example, media access control (MAC) address from an Ethernet packet, an Internet Protocol (IP) address, at least a portion of a hierarchical address, a combination of two or more identifiers at different protocol levels for the data packet, a port number of a universal datagram protocol, or other appropriate identifier. Additionally, the connection between the secondary sites and the consumers of the services may be HFC, copper wire DSL or wireless network systems.

What is claimed is:

1. A telecommunications network comprising:
   a primary site that includes a master controller;
   at least one secondary site;
   the primary site and the at least one secondary site each including a ring switch, wherein the ring switches are interconnected to form a transport ring;
   the ring switches each using at least one table that tracks the identity of network devices associated with each port of the ring switch based on source identifiers of data packets received at the ports of the ring switch and wherein data packets received at a ring port that are not destined for a network device associated with a local port of the ring switch are switched to another ring switch based on the at least one table without the use of a token or encapsulating the data packet; and
   at least one local controller communicatively coupled to a local port of one of the at least one secondary site, the local controller and the master controller communicating by transmitting packets over the transport ring.

2. The network of claim 1, wherein the at least one local controller comprises a circuit that reads values of a utility meter.

3. The network of claim 1, wherein the at least one local controller comprises a circuit that controls equipment that is coupled to a utility network.

4. The network of claim 1, wherein the at least one local controller includes a set top box.

5. The network of claim 1, wherein the at least one local controller provides access to video on demand services.

6. The network of claim 1, wherein the at least one local controller provides access to pay per view programming.

7. The network of claim 1, wherein the at least one local controller provides access to near video on demand programming.

8. The network of claim 1, wherein the at least one local controller comprises a circuit that reads equipment in the network.

9. The network of claim 1, wherein the at least one local controller comprises a circuit that controls equipment in the network.

10. A method for routing control information in a telecommunications network, the method comprising:
    receiving control information from a first controller for transmission to a second controller;
    placing the control information in packets on a ring network that includes ring switches that each include a table adapted to self-learn which network devices are associated with each port of the ring switch;
    selectively switching the packets around the ring network based on a destination identifier of the packets using the table without the use of a token or encapsulating the data packet; and
    removing the packets from the ring at a local port of the ring switch when the table for the ring switch and the destination identifier indicate that the destination network device is located on a local port of the ring switch without the use of a token or encapsulating the data packet.

11. The method of claim 10, wherein receiving control information from a first controller for transmission to a second controller comprises receiving control information from a local controller for transmission to a master controller.

12. The method of claim 10, wherein receiving control information from a first controller for transmission to a second controller comprises receiving control information from a master controller for transmission to a local controller.

13. The method of claim 10, wherein receiving control information comprises receiving values of a utility meter.

14. The method of claim 10, wherein receiving control information comprises receiving signals for controlling equipment that is coupled to a utility network.

15. The method of claim 10, wherein receiving control information comprises receiving signals from or for a set top box.

16. The method of claim 10, wherein receiving control information comprises receiving a request for or access to video on demand services.

17. The method of claim 10, wherein receiving control information comprises receiving a request for or access to pay per view programming.

18. The method of claim 10, wherein receiving control information comprises receiving a request for or access to near video on demand programming.

19. The method of claim 10, wherein receiving control information comprises receiving values from equipment in the network.

20. The method of claim 10, wherein receiving control information comprises receiving signals for controlling equipment in the network.

21. A network comprising:
    a primary site including a master controller;
    at least one secondary site; and
    a ring of ring switches that communicatively couple the primary site and the at least one secondary site in a ring, each ring switch having a table adapted to self-learn network devices associated with each port of the ring switch such that the ring switch associates destination identifiers with ports of the ring switch to switch data packets off from the ring at the primary site or at one of the at least one secondary sites based on an identifier in the data packets that identifies a destination local controller or the master controller without the use of a token or encapsulating the data packets.

22. The network of claim 21, wherein the local controller comprises a circuit that reads values of a utility meter.

23. The network of claim 21, wherein the local controller comprises a circuit that controls equipment that is coupled to a utility network.

24. The network of claim 21, wherein the local controller includes a set top box.

25. The network of claim 21, wherein the local controller provides access to video on demand services.

26. The network of claim 21, wherein the local controller provides access to pay per view programming.

27. The network of claim 21, wherein the local controller provides access to near video on demand programming.

28. The network of claim 21, wherein the local controller comprises a circuit that reads values of equipment in the network.

29. The network of claim 21, wherein the local controller comprises a circuit that controls equipment in the network.

30. A method for routing control information in a telecommunications network, the method comprising:

receiving packets from a first controller for a second controller;

placing the packets on a ring network that includes ring switches that each include a table adapted to self-learn network devices associated with each port of the ring switch;

selectively switching the packets around and off the ring network based on destination identifiers of the packets using the table without the use of a token or encapsulating the data packets; and selectively removing the packets based on a source identifier when the source identifier is associated with a local port of the ring switch.

31. The method of claim 30, wherein receiving control packets from a first controller for transmission to a second controller comprises receiving control information from a local controller for transmission to a master controller.

32. The method of claim 30, wherein receiving control packets from a first controller for transmission to a second controller comprises receiving control information from a master controller for transmission to a local controller.

33. The method of claim 30, wherein receiving control packets comprises receiving values of a utility meter.

34. The method of claim 30, wherein receiving control packets comprises receiving signals for controlling equipment that is coupled to a utility network.

35. The method of claim 30, wherein receiving control packets comprises receiving signals from or for a set top box.

36. The method of claim 30, wherein receiving control packets comprises receiving a request for or access to video on demand services.

37. The method of claim 30, wherein receiving control packets comprises receiving a request for or access to pay per view programming.

38. The method of claim 30, wherein receiving control packets comprises receiving a request for or access to near video on demand programming.

39. The method of claim 30, wherein receiving control packets comprises receiving values of equipment in the network.

40. The method of claim 30, wherein receiving control packets comprises receiving signals for controlling equipment in the network.

* * * * *